(12) United States Patent
Tsukagoshi et al.

(10) Patent No.: US 7,385,741 B2
(45) Date of Patent: Jun. 10, 2008

(54) HOLOGRAPHIC RECORDING SYSTEM AND OPTICAL CHOPPER

(75) Inventors: Takuya Tsukagoshi, Sagamihara (JP); Jiro Yoshinari, Tokyo (JP)

(73) Assignee: TDK Corporation, Tokyo (JP)

( * ) Notice: Subject to any disclaimer, the term of this patent is extended or adjusted under 35 U.S.C. 154(b) by 393 days.

(21) Appl. No.: 10/560,344

(22) PCT Filed: May 31, 2004

(86) PCT No.: PCT/JP2004/007492

§ 371 (c)(1), (2), (4) Date: Dec. 12, 2005

(87) PCT Pub. No.: WO2005/001820

PCT Pub. Date: Jan. 6, 2005

(65) Prior Publication Data

US 2006/0140101 A1 Jun. 29, 2006

(30) Foreign Application Priority Data

Jun. 25, 2003 (JP) ............................. 2003-180498

(51) Int. Cl.
*G11B 7/00* (2006.01)
*G03H 1/12* (2006.01)

(52) U.S. Cl. .................... 359/11; 359/30; 369/112.01

(58) Field of Classification Search .................. 359/11, 359/30

See application file for complete search history.

(56) References Cited

U.S. PATENT DOCUMENTS

| 4,828,384 A | * | 5/1989 | Plankenhorn et al. ....... 356/121 |
| 5,454,048 A | * | 9/1995 | Davis ......................... 382/281 |
| 2006/0072424 A1 | * | 4/2006 | Everett et al. ......... 369/112.01 |

FOREIGN PATENT DOCUMENTS

| JP | A 2002-170247 | 6/2002 |
| JP | A 2002-183975 | 6/2002 |

* cited by examiner

*Primary Examiner*—Fayez G Assaf
(74) *Attorney, Agent, or Firm*—Oliff & Berridge, PLC

(57) ABSTRACT

A holographic recording system with a simple structure is provided that can make a holographic recording beam follow a recording medium traveling even at high speed. The holographic recording system 10 includes a chopper lens 30 that travels in synchronization with and in a same direction as the holographic recording medium 14. The chopper lens 30 is formed so as to move the axes of incident information and reference beams relative to the recording medium and the chopper lens, and to irradiate them to an identical information recording region 15 in the holographic recording medium 14.

17 Claims, 4 Drawing Sheets

1

HOLOGRAPHIC RECORDING SYSTEM AND OPTICAL CHOPPER

TECHNICAL FIELD

The present invention relates to a holographic recording system and an optical chopper that utilize holography to record information into a holographic recording medium.

BACKGROUND ART

In holographic recording that utilizes holography to record information into a recording medium, an information beam and a reference beam are superposed each other in a holographic recording medium and an optical interference pattern formed by these beams is written as a diffraction grating.

As one of holographic recording systems, there is a system that modulates a recording beam comprising the information and reference beams in time and space and irradiates it to a recording medium while continuously moving the recording medium with respect to the optical axis of the recording beam. This includes, for example, a holographic recording system that irradiates the recording beam from an optical head while rotating a disc-shaped recording medium.

In this case, to prevent an aberration of the diffraction grating to be recorded in the recording medium moving relative to the recording beam, a light pulse as short as several tens nanoseconds is necessary to perform recording, causing the sensitivities in both recording and reproducing to decrease.

Alternatively, as described in, for example, Japanese Patent Laid-Open Publication No. 2002-183975, there is another holographic recording system that drives an optical head along tracks formed in the circumference direction of a disc-shaped recording medium by using an elastic arm, an electromagnetic coil, and a magnet to change the position of the recording beam.

This is the so-called stop-and-go recording method, in which recording is performed so that the variation of the relative position of the recording beam with respect to an information recording region in the recording medium will not occur when the recording medium rotates, and then the optical head is moved back to the original position while the recording beam (laser beam) turns off.

In the holographic recording system described in the above Japanese Patent Laid-Open Publication No. 2002-183975, irradiation position moving means comprising an elastic arm, an electromagnetic coil, and a magnet is provided as described above and is controlled by a follow-up control circuit so as to make the irradiation position of the recording beam follow an information recording region in the recording medium for a predetermined time and move it back to the original position. Therefore, the structure is complicated, the fabrication cost is high, and there is a risk that the recording beam cannot reliably follow the recording medium when the recording medium is rotated at high speed.

DISCLOSURE OF THE INVENTION

The present invention addresses the above-described problems in the conventional technology, with an object of providing a holographic recording system and an optical chopper that have a simple structure and can make the record beam reliably follow a recording medium even if the recording medium is moved at high speed.

As a result of diligent research, the present inventor has found that holographic recording is possible so that the recording beam can be irradiated to an identical position in the holographic recording medium, by using a chopper lens traveling in synchronization with the holographic recording medium and deflecting a recording beam according to its incident positions on the chopper lens.

In summary, the above-described objectives are achieved by the following aspects of the present invention.

(1) A holographic recording system, comprising:
a light beam irradiation unit for irradiating an information beam and a reference beam so that an interference pattern formed by the information beam and the reference beam can be recorded as a diffraction grating into an information recording region in a holographic recording medium; a recording medium moving unit for moving the holographic recording medium with respect to the optical axes of the information beam and the reference beam; and an optical chopper provided on the optical axes of the information beam and the reference beam between the light beam irradiation unit and the holographic recording medium, the optical chopper moving the optical axes in a same traveling direction as, by substantially a same traveling distance as, and in synchronization with the information recording region, when performing holographic recording into the information recording region by using the information beam and the reference beam.

(2) The holographic recording system according to (1), wherein: the optical chopper comprises a chopper lens that travels in synchronization with and in a same direction as the information recording region; and the chopper lens is formed so as to irradiate the information beam and the reference beam from the light beam irradiation unit to be incident on the information recording region, and to refract the information beam and the reference beam according to variations of incident positions on the chopper lens to make exit optical axes pass through an identical point, when performing the holographic recording.

(3) The holographic recording system according to (2), wherein: the holographic recording medium has a disc shape; the optical chopper comprises a disc-shaped chopper disc having substantially a same radius as the holographic recording medium and capable of rotating in synchronization with the holographic recording medium; the chopper disc has a plurality of ring-shaped regions disposed at different positions in a radius direction; and the chopper lenses are discretely disposed in each of the ring-shaped regions in the chopper disc, with identical length and pitch in a circumference direction, and are formed so as to make the reference beam and the information beam pass through the chopper disc in a thickness direction.

(4) The holographic recording system according to (2) or (3), wherein the chopper lens is a cylindrical lens elongated in a direction orthogonal to a traveling direction of the holographic recording medium.

(5) The holographic recording system of either one of (3) or (4), wherein the holographic recording medium and the chopper disc are coaxially and integrally provided so as to be freely rotated.

(6) The holographic recording system of either one of (1) to (5), further comprising: a CCD camera for forming a reconstructed holographic image by a diffraction beam from the information recording region in the holographic recording medium, when a reconstructing beam is irradiated to the information recording region through the chopper lens; and a compensating unit for compensating position offset of the reconstructed holographic image obtained by the CCD camera, caused by movement of the chopper lens.

(7) An optical chopper comprising: a chopper disc having a rotatable disc shape and comprising a plurality of ring-shaped regions disposed at different positions in a radius direction; and a plurality of chopper lenses that are discretely disposed in the ring-shaped regions in the chopper disc, with an identical length and pitch in a circumference direction, and refracts and transmits a beam incident from one surface of the chopper disc to the other surface thereof, wherein the chopper lens is formed such that, when the chopper lens is rotated in a fixed direction at a constant speed together with the chopper disc, an exit optical axis of a laser beam incident from the one surface is refracted so as to take a fixed position in a rotational direction in a specific plane disposed on the other surface.

(8) The optical chopper of (7), wherein the chopper lenses are each a cylindrical lens elongated in the radius direction of the chopper disc.

(9) The optical chopper of (7) or (8), wherein the chopper lenses and the chopper disc are integrally formed of a transparent resin.

BEST MODE FOR CARRYING OUT THE INVENTION

An exemplary embodiment of the invention will now be described in detail with reference to the attached drawings.

Figure 1:
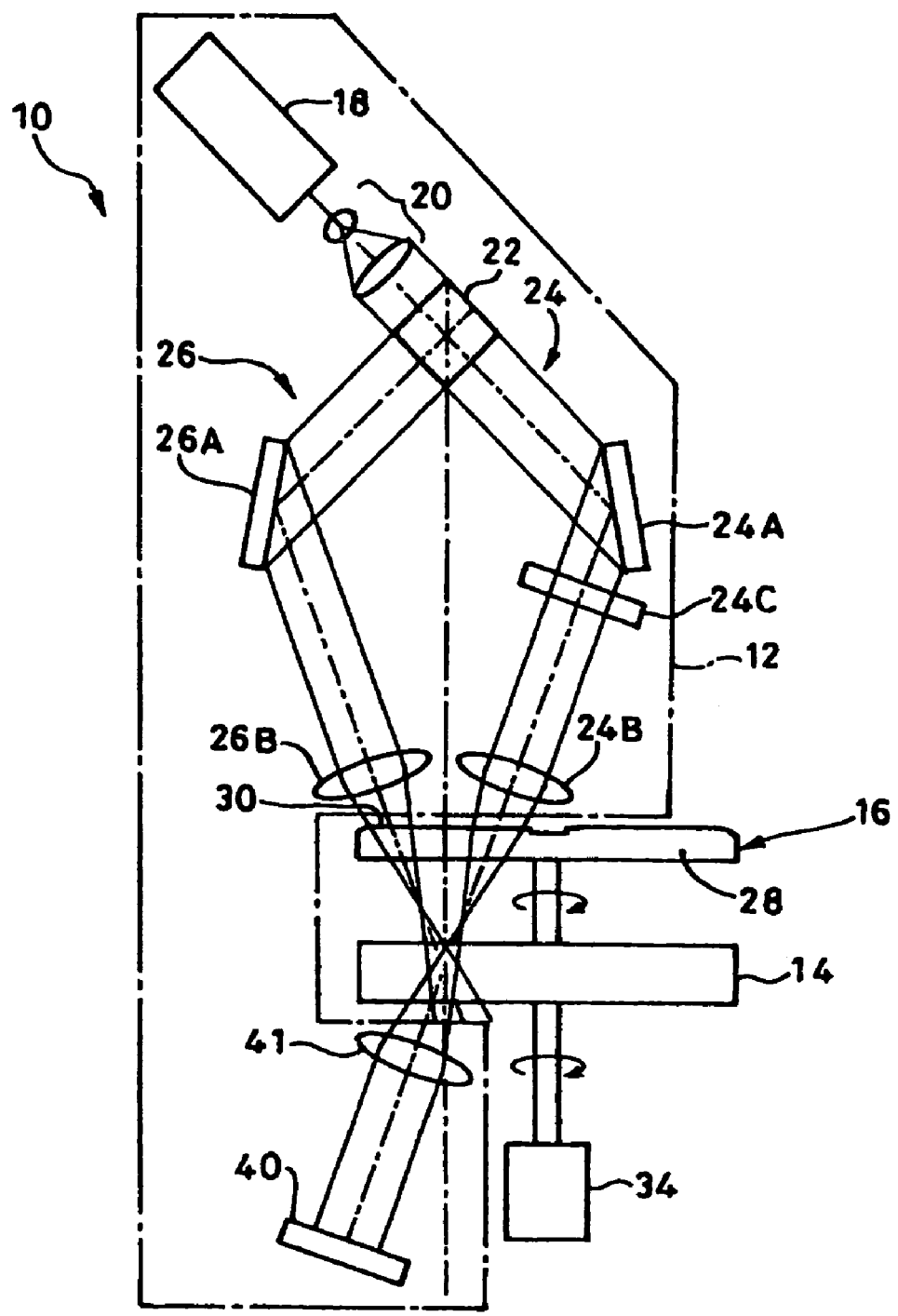
FIG. 1 is a schematic front view including part of an optical block diagram and illustrating the holographic recording system according to an exemplary embodiment of the invention.

As shown in FIG. 1, a holographic recording system 10 according to the exemplary embodiment of the invention comprises: an optical head 12 that is a light irradiation unit; a holographic recording medium 14; and an optical chopper 16 that is an optical axis moving unit. An interference pattern formed by information and reference beams from the optical head 12 is recorded in the holographic recording medium 14 as a diffraction grating. The optical chopper 16 is provided on the optical axes of the information and reference beams between the optical head 12 and the holographic recording medium 14, and functions as an optical axis shifting unit which moves the optical axes while making these information and reference beams be in synchronization with the movement of the holographic recording medium 14.

The optical head 12 comprises: a laser light source 18; a beam expander 20 for expanding the diameter of the laser beam from the laser light source 18; a beam splitter 22 for splitting the laser beam, the diameter of which has been expanded by the beam expander 20, into a reference beam and an information beam; an information optical system 24 for the information beam split by the beam splitter 22; and a reference optical system 26 for the reference beam.

Figure 4:
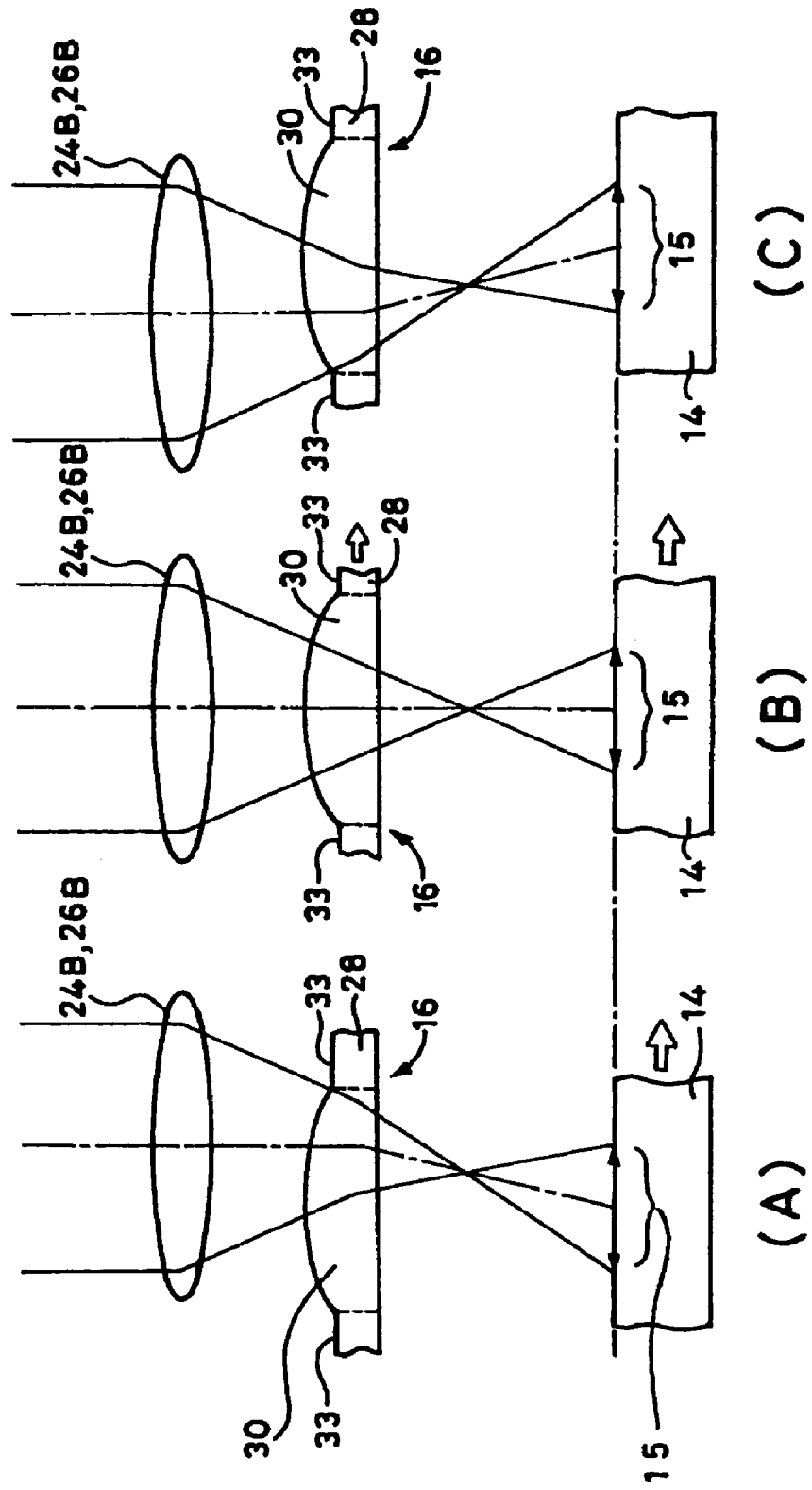
FIG. 4 illustrates optical path diagrams describing the operation of a chopper lens in the optical chopper.

The information optical system 24 comprises: a mirror 24A that reflects the information beam having passed through the beam splitter 22; a Fourier lens 24B that irradiates the information beam reflected by the mirror 24A to an information recording region 15 (see FIG. 4) in the holographic recording medium 14; and a spatial light modulator (SLM) 24C that is provided on the optical path of the information beam between the mirror 24A and the Fourier lens 24B and adds two-dimensional information to the information beam.

The reference optical system 26 comprises a mirror 26A for reflecting the reference beam reflected by the beam splitter 22 and a Fourier lens 26B for irradiating the reference beam reflected by the mirror 26A to the information recording region 15.

Figure 2:
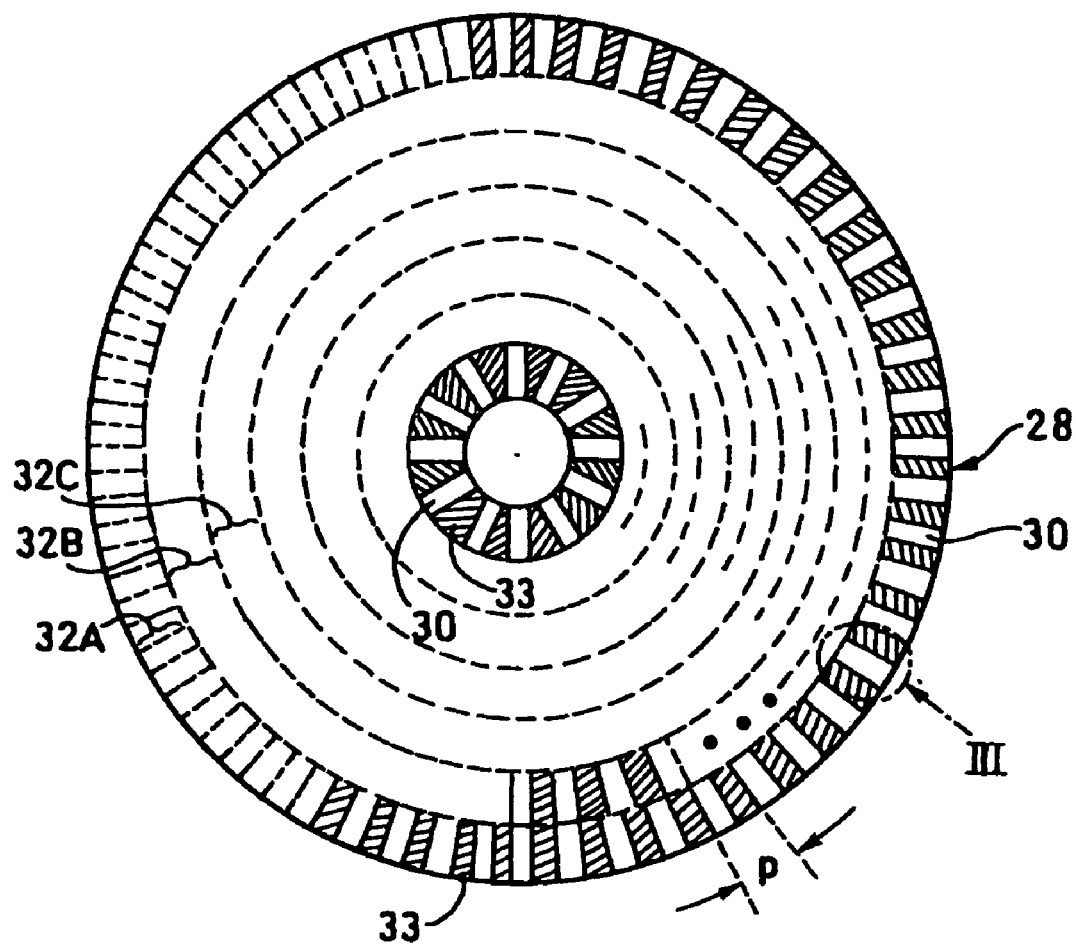
FIG. 2 is a plane view illustrating the optical chopper used in the exemplary embodiment.

Referring to FIG. 2, the optical chopper 16 comprises a rotatable disc-shaped chopper disc 28 and a plurality of chopper lenses 30 that are integrally provided in the chopper disc 28 and refracts and transmits the beams incident from the upper surface side of the chopper disc 28 to the lower side in FIG. 1.

The chopper lenses 30 are discretely disposed in a plurality of ring regions 32A, 32B, 32C, and so on, which are disposed at different positions in the radius direction of the chopper disc 28, with identical length and pitch (p) in the circumference direction.

Figure 3:
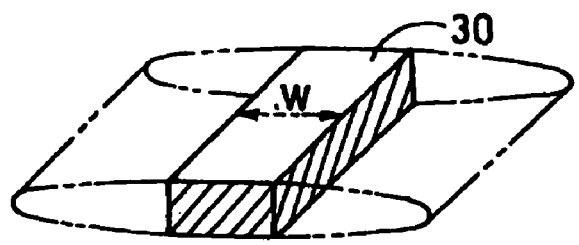
FIG. 3 is an enlarged perspective view of portion III in FIG. 2.

As shown in an enlarged view in FIG. 3, the chopper lens 30 is obtained by cutting out part of a cylindrical lens to a width w.

In the exemplary embodiment, the optical chopper 16 is formed of the same optical resin as used in precision lenses such as aspherical lenses to integrate the chopper disc 28 and the chopper lenses 30. As an optical resin, for example, polycarbonate resin or acrylic resin is used.

As described above, the chopper lenses 30 are discretely formed in the circumference direction of the ring regions 32A, 32B, 32C, and so on in the chopper disc 28. In addition, masks 33 shown by hatched lines in FIG. 2 are also formed between each of the chopper lenses 30 by, for example, printing to block the beams.

The optical chopper 16 is supported by a spindle controller 34 so as to rotate integrally with the holographic recording medium 14. In FIG. 2, the chopper lenses 30 disposed in the ring region 32A are only shown, and those in other ring regions are omitted.

The chopper lens 30 is formed so that when it is rotated in a certain direction together with the chopper disc 28, the optical axes of the laser beams (information and reference beams) incident from the upper side in FIG. 1 can take a fixed position in the rotational direction in the holographic recording medium 14.

That is, as shown in FIGS. 4(A) to 4(C), when the chopper lens 30 rotates and thereby moves together with and in synchronization with the holographic recording medium 14 in the right direction in the drawing, the information and reference beams having passed through the respective Fourier lenses 24B and 26B are incident from the upper side onto the chopper lens 30, from which they exit downward. In this case, the lens shape is formed so that their optical axes can take a fixed position in the rotational direction in a specific plane of the holographic recording medium 14 and thereby the beams illuminate an identical information recording region 15 in the holographic recording medium 14.

More in detail, as shown in FIG. 4(A), the optical axis of the beam incident from the right side of the chopper lens 30 in the drawing is refracted toward the left by the chopper lens 30, and is irradiated to the information recording region 15.

Next, when the holographic recording medium 14 and the chopper lens 30 move as shown in FIG. 4(B), the optical axes of the information and reference beams on the exit side match the center axis of the chopper lens 30, and are irradiated to the information recording region 15 moving in synchronization with the chopper lens 30.

When the chopper lens 30 further moves in the right direction as shown in FIG. 4(C), the information and reference beams are incident on the left side of the chopper lens 30 rather than the center thereof, where they are refracted toward the right and irradiated to the information recording region 15 in the synchronously moving holographic recording medium 14.

Accordingly, while the holographic recording medium 14 and chopper lens 30 are moving in synchronization with each other, the information and reference beams from the Fourier lenses 24B and 26B are irradiated to the same information recording region 15.

Incidentally, the optical head 12 is typically formed so that it can integrally move in the radius direction of the holographic recording medium 14.

In the optical head 12, a CCD camera 40 is provided on the opposite side of the optical chopper 16 with the holographic recording medium 14 in between so that a reconstructed holographic image can be formed when the diffraction beam is incident from the information recording region 15 via a Fourier lens 41.

When forming the reconstructed holographic image, the beam from the information optical system 24 is blocked by the spatial light modulator 24C to irradiate the reference beam from the reference optical system 26 to the information recording region 15, the diffraction beam from which is then made incident on the CCD camera 40 through the Fourier lens 41 (see FIG. 1).

Figure 5:
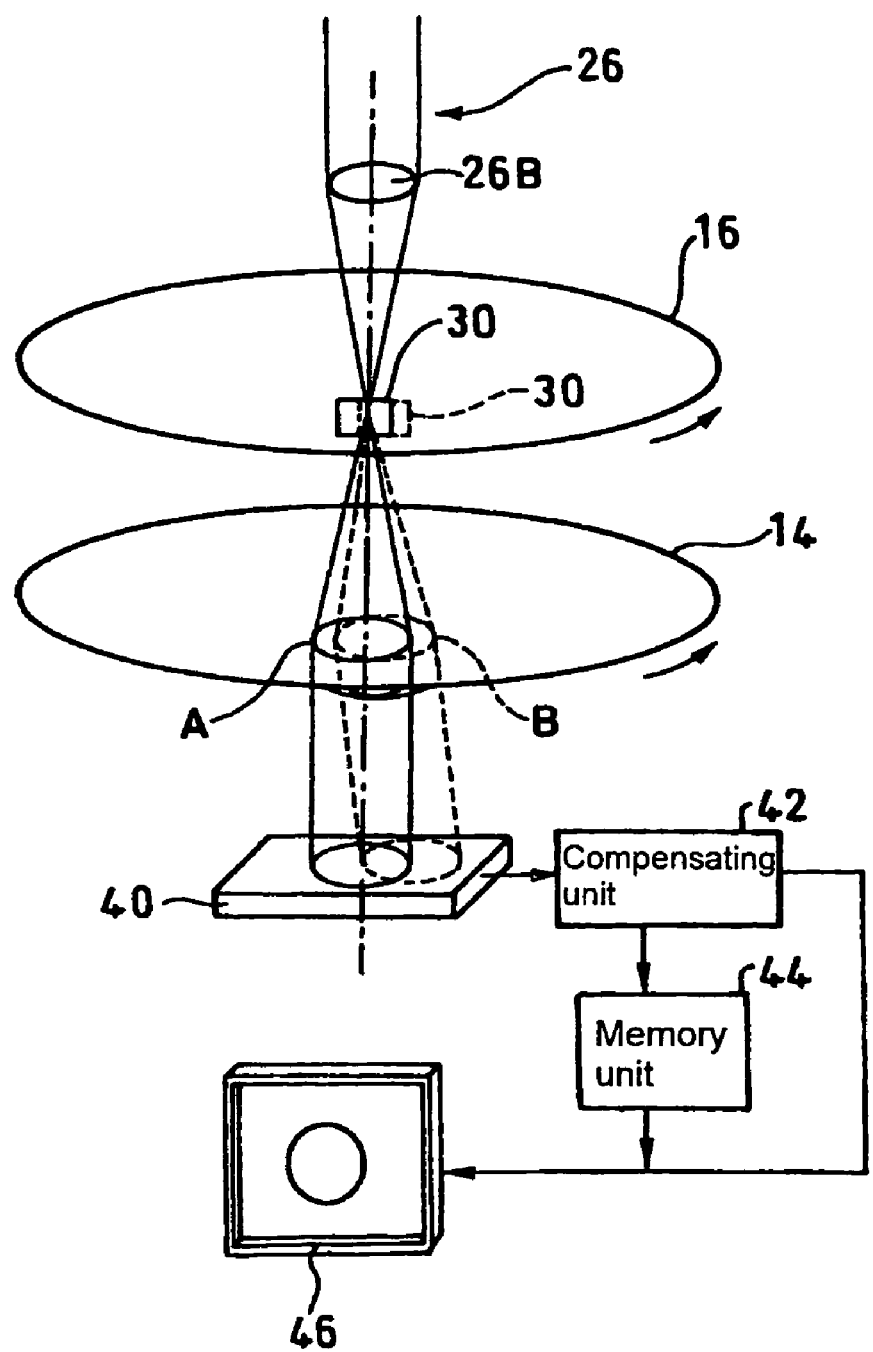
FIG. 5 is a schematic perspective view including part of a block diagram and illustrating the process of reproducing information in the holographic recording system.

As shown in FIG. 5, a compensating unit 42 is connected to the CCD camera 40. When reproducing information, the compensating unit 42 compensates the position offset of a reconstructed holographic image, which is caused by movement of the reconstructed holographic image on the CCD camera 40, the movement occurring due to the rotation of the holographic recording medium 14 and chopper lens 30. The compensated reconstructed holographic image is then output to a memory unit 44 and/or a display unit 46.

The necessity and operation of the compensating unit 42 will be described in detail below.

When an information beam is irradiated to the center of the chopper lens 30 (solid line), it exits toward a position A on the holographic recording medium 14 without changing its optical axis. When the optical chopper 16 and the holographic recording medium 14 rotate in the direction indicated by an arrow and the information beam is irradiated to the left side of the chopper lens 30 as indicated by a broken line, the information beam is diffracted by the chopper lens 30 toward the right in FIG. 5 and exits toward a position B on the holographic recording medium 14. In this case, since the traveling distances of the optical chopper 16 (chopper lens 30) and the holographic recording medium 14 by rotation and the distance between the positions A and B are all substantially equal to one another, the information beam passing through an identical chopper lens 30 always illuminates an identical point on the holographic recording medium 14.

In contrast, as appreciated from FIG. 5, a position on the CCD camera 40 toward which an image is focused changes as the optical chopper 16 and the holographic recording medium 14 rotate. In this case, however, its changing rate (traveling speed of the reconstructed image on the CCD camera) is predictable if the arrangements of the optical systems and the holographic recording medium 14, the rotational speed of the holographic recording medium 14 (the optical chopper 16), and the position (radius) of the chopper lens 30 in the optical chopper 16 are known. Therefore, the same reproduced image as the one obtained when the holographic recording medium 14 is stationary can be easily obtained by performing image processing (translational movement) by using the compensating unit 42 on the reconstructed image detected by the CCD camera 40.

In the above-described exemplary embodiment, the chopper disc 28 and the chopper lenses 30 are integrally formed of a transparent resin, but the present invention is not limited to this formation. Chopper lenses may also be formed so as to be mounted on a chopper disc. When the chopper disc 28 and the chopper lenses 30 are integrally formed as in the exemplary embodiment, however, the fabrication cost and the accuracy of assembling the chopper lenses and chopper disc can be improved.

According to the above exemplary embodiment, the chopper lens 30 comprises a cylindrical lens or a part thereof elongated in the radius direction of the chopper disc 28, so that, as shown in FIG. 1, it fits to the information and reference optical systems 24 and 26 disposed above an identical radius of the holographic recording medium 14 and in the plane orthogonal thereto, more specifically to the arrangement of the optical axes of the information and reference beams passing through the Fourier lenses 24B and 26B.

In the above exemplary embodiment, the holographic recording medium 14 is constructed so as to rotate, but the invention is not limited to this construction. Provided that it moves in the orthogonal direction with respect to the plane defined by the optical axes of the information and reference beams, the movement is not restricted to rotation. In this case, however, the chopper lenses 30 are also moved in synchronization with and in the same direction as the holographic recording medium 14.

INDUSTRIAL APPLICABILITY

Since the invention has the above-described structure, it has an excellent advantage in that the axes of the information and reference beams can be moved following the holographic recording medium, without employing any irradiation position moving means having a complicated structure for the optical head.

The invention claimed is:

1. A holographic recording system, comprising:
   a light beam irradiation unit for irradiating an information beam and a reference beam so that an interference pattern formed by the information beam and the reference beam can be recorded as a diffraction grating into an information recording region in a holographic recording medium;
   a recording medium moving unit for moving the holographic recording medium with respect to the optical axes of the information beam and the reference beam; and
   an optical chopper provided on the optical axes of the information beam and the reference beam between the light beam irradiation unit and the holographic recording medium, the optical chopper moving the optical axes in a same traveling direction as, by substantially a same traveling distance as, and in synchronization with the information recording region, when performing holographic recording into the information recording region by using the information beam and the reference beam.

2. The holographic recording system according to claim 1, wherein: the optical chopper comprises a chopper lens that travels in synchronization with and in a same direction as the information recording region; and the chopper lens is formed so as to irradiate the information beam and the reference beam from the light beam irradiation unit to be incident on the information recording region, and to refract the information beam and the reference beam according to variations of incident positions on the chopper lens to make exit optical axes pass through an identical point, when performing the holographic recording.

3. The holographic recording system according to claim 2, wherein: the holographic recording medium has a disc shape; the optical chopper comprises a disc-shaped chopper disc having substantially a same radius as the holographic recording medium and capable of rotating in synchronization with the holographic recording medium; the chopper disc has a plurality of ring-shaped regions disposed at different positions in a radius direction; and the chopper lenses are discretely disposed in each of the ring-shaped regions in the chopper disc, with identical length and pitch in a circumference direction, and are formed so as to make the reference beam and the information beam pass through the chopper disc in a thickness direction.

4. The holographic recording system according to any one of claim 3, further comprising: a CCD camera for forming a reconstructed holographic image by a diffraction beam from the information recording region in the holographic recording medium, when a reconstructing beam is irradiated to the information recording region through the chopper lens; and a compensating unit for compensating position offset of the reconstructed holographic image obtained by the CCD camera, caused by movement of the chopper lens.

5. The holographic recording system according to claim 3, wherein the holographic recording medium and the chopper disc are coaxially and integrally provided so as to be freely rotated.

6. The holographic recording system according to any one of claim 5, further comprising: a CCD camera for forming a reconstructed holographic image by a diffraction beam from the information recording region in the holographic recording medium, when a reconstructing beam is irradiated to the information recording region through the chopper lens; and a compensating unit for compensating position offset of the reconstructed holographic image obtained by the CCD camera, caused by movement of the chopper lens.

7. The holographic recording system according to claim 3, wherein the chopper lens is a cylindrical lens elongated in a direction orthogonal to a traveling direction of the holographic recording medium.

8. The holographic recording system of according to claim 7, wherein the holographic recording medium and the chopper disc are coaxially and integrally provided so as to be freely rotated.

9. The holographic recording system according to claim 2, wherein the chopper lens is a cylindrical lens elongated in a direction orthogonal to a traveling direction of the holographic recording medium.

10. The holographic recording system according to any one of claim 9, further comprising: a CCD camera for forming a reconstructed holographic image by a diffraction beam from the information recording region in the holographic recording medium, when a reconstructing beam is irradiated to the information recording region through the chopper lens; and a compensating unit for compensating position offset of the reconstructed holographic image obtained by the CCD camera, caused by movement of the chopper lens.

11. The holographic recording system of according to claim 9, wherein the holographic recording medium and the chopper disc are coaxially and integrally provided so as to be freely rotated.

12. The holographic recording system according to any one of claim 2, further comprising: a CCD camera for forming a reconstructed holographic image by a diffraction beam from the information recording region in the holographic recording medium, when a reconstructing beam is irradiated to the information recording region through the chopper lens; and a compensating unit for compensating position offset of the reconstructed holographic image obtained by the CCD camera, caused by movement of the chopper lens.

13. The holographic recording system according to any one of claims 1, further comprising: a CCD camera for forming a reconstructed holographic image by a diffraction beam from the information recording region in the holographic recording medium, when a reconstructing beam is irradiated to the information recording region through the chopper lens; and a compensating unit for compensating position offset of the reconstructed holographic image obtained by the CCD camera, caused by movement of the chopper lens.

14. An optical chopper comprising: a chopper disc having a rotatable disc shape and comprising a plurality of ring-shaped regions disposed at different positions in a radius direction; and a plurality of chopper lenses that are discretely disposed in the ring-shaped regions in the chopper disc, with an identical length and pitch in a circumference direction, and refracts and transmits a beam incident from one surface of the chopper disc to the other surface thereof, wherein the chopper lens is formed such that, when the chopper lens is rotated in a fixed direction at a constant speed together with the chopper disc, an exit optical axis of a laser beam incident from the one surface is refracted so as to take a fixed position in a rotational direction in a specific plane disposed on the other surface.

15. The optical chopper of claim 14, wherein the chopper lenses are each a cylindrical lens elongated in the radius direction of the chopper disc.

16. The optical chopper of claim 15, wherein the chopper lenses and the chopper disc are integrally formed of a transparent resin.

17. The optical chopper of claim 14, wherein the chopper lenses and the chopper disc are integrally formed of a transparent resin.

* * * * *